(12) United States Patent
Spremo et al.

(10) Patent No.: US 6,847,749 B1
(45) Date of Patent: Jan. 25, 2005

(54) DIFFRACTION-BASED OPTICAL SWITCH

(75) Inventors: Stevan M. Spremo, Campbell, CA (US); Peter L. Fuhr, Santa Cruz, CA (US); John F. Schipper, Palo Alto, CA (US)

(73) Assignees: The United States of America as represented by the Administrator of the National Aeronautics and Space Administration, Washington, DC (US); San Jose State University, San Jose, CA (US)

( * ) Notice: Subject to any disclaimer, the term of this patent is extended or adjusted under 35 U.S.C. 154(b) by 0 days.

(21) Appl. No.: 10/058,873

(22) Filed: Jan. 18, 2002

(51) Int. Cl.[7] .............................. G02B 6/26; G02B 6/42
(52) U.S. Cl. .............................. 385/15; 385/18; 385/37
(58) Field of Search .............................. 385/10, 16–18, 385/37; 359/573, 575

(56) References Cited

U.S. PATENT DOCUMENTS

| | | | | | |
|---|---|---|---|---|---|
| 3,942,048 | A | * | 3/1976 | Laude et al. | 310/311 |
| 4,142,774 | A | * | 3/1979 | Wright | 385/4 |
| 5,841,912 | A | | 11/1998 | Mueller-Fiedler | |
| 5,960,133 | A | | 9/1999 | Tomlinson | |
| 6,201,909 | B1 | * | 3/2001 | Kewitsch et al. | 385/37 |
| 6,283,601 | B1 | | 9/2001 | Hagelin et al. | |
| 6,363,187 | B1 | * | 3/2002 | Fells et al. | 385/37 |
| 6,597,763 | B2 | * | 7/2003 | Holler et al. | 378/82 |

OTHER PUBLICATIONS

E. Hecht, *Optics*, Addison Wesley, Reading, Third Edition, 1998, pp. 465–475.
"Piezoceramic Design Notes", Sensors, Mar. 1984, 8 pp.
M. Goldfarb et al, "Modeling Piezoelectric Stack Actuators . . . ", IEEE Trans On Control Systems, Jun. 1997, pp. 69–79.
"Theory Of Piezoelectrics", pp. 3–14.
"Introduction To Piezoelectric Ceramic", pp. 5–27.

* cited by examiner

*Primary Examiner*—Edward J. Glick
*Assistant Examiner*—Thomas R Artman
(74) *Attorney, Agent, or Firm*—Robert M. Padilla; John F. Schipper (57) ABSTRACT

Method and system for controllably redirecting a light beam, having a central wavelength $\lambda$, from a first light-receiving site to a second light-receiving site. A diffraction grating is attached to or part of a piezoelectric substrate, which is connected to one or two controllable voltage difference sources. When a substrate voltage difference is changed and the diffraction grating length in each of one or two directions is thereby changed, at least one of the diffraction angle, the diffraction order and the central wavelength is controllably changed. A diffracted light beam component, having a given wavelength, diffraction angle and diffraction order, that is initially received at a first light receiving site (e.g., a detector or optical fiber) is thereby controllably shifted or altered and can be received at a second light receiving site. A polynomially stepped, chirped grating is used in one embodiment. In another embodiment, an incident light beam, having at least one of first and second wavelengths, $\lambda 1$ and $\lambda 2$, is received and diffracted at a first diffraction grating to provide a first diffracted beam. The first diffracted beam is received and diffracted at a second diffraction grating to produce a second diffracted beam. The second diffracted beam is received at a light-sensitive transducer, having at least first and second spaced apart light detector elements that are positioned so that, when the incident light beam has wavelength $\lambda 1$ or $\lambda 2$ ($\lambda 1 \neq \lambda 2$), the second diffracted beam is received at the first element or at the second element, respectively; change in a selected physical parameter at the second grating can also be sensed or measured. A sequence of spaced apart light detector elements can be positioned along a linear or curvilinear segment with equal or unequal spacing.

18 Claims, 6 Drawing Sheets

Simple diffraction

FIG. 5A

Diffraction after dilatation

FIG. 5B

Diffraction after quasi-rotation

FIG. 5C

Diffraction after twisting

DIFFRACTION-BASED OPTICAL SWITCH

ORIGIN OF THE INVENTION

The invention disclosed herein was made by employees of and contractors with the United States Government and may be manufactured and used by or for the Government for governmental purposes without payment of any royalties for such manufacture and use.

FIELD OF THE INVENTION

This invention relates to optical switching based on wavelength differences, using diffraction grating structures.

BACKGROUND OF THE INVENTION

Optical switches serve numerous purposes within an optical network. Each such application has its own required time of reaction, and these reaction times vary over about eight orders of magnitude. Four applications are of special interest today. A first application is provisioning, wherein switches are used inside optical cross-connects for reconfiguring to support or define a new light path. This type of switch typically replaces a mechanical switch or a fiber patch panel, with a leisurely required switching times of 1–10 msec. A second application is protection switching, used to switch optical data traffic from a first primary fiber to a second primary fiber, where the first fiber has failed or otherwise malfunctions. Because such a switch typically operates between two such primary fibers, in a 2×2 array, the required switching times are of the order of hundreds of μsec.

A third application is packet switching, driven in part by a migration of voice to data processing channels. Such switches are important in high speed (OCn, with $n \geq 12$) networks that switch individual optical packets, with required switching times that are smaller than a typical packet duration. For example, a 53-byte ATM packet at 10 Gbps is 42 nsec in duration and requires a packet switching time of no more than 5–10 nsec. A fourth application is external on/off modulation, with a required switching time that is a small fraction of bit duration (e.g., 100 psec for a 10 Gbps data stream).

Switching times for the first and second applications can be reasonably met with currently available technology, but the third and fourth applications require switching times and associated reliabilities that are not yet achieved. What is needed is an optical switch that can switch a light beam having a selected wavelength between a first optical path and a second optical path in a time interval between a few milliseconds and a few nanoseconds and that can reliably provide this switching for each of several selected wavelengths. Preferably, this switching should be reproducible and should quickly respond to change of at most one or two parameters.

SUMMARY OF THE INVENTION

These needs are met by the invention, which, in one embodiment, provides a diffraction grating that is attached to a piezoelectric substrate that is in turn connected at spaced apart locations to one or more controllable voltage sources. As the voltage difference is (quickly) changed from a first selected value to a second selected value, the length and/or angular orientation of the attached diffraction grating are also changed. One, two or three voltages sources in different directions can be impressed to provide dilatation, rotation in a plane, and twist for the grating. This change shifts the order, wavelength and/or corresponding angle of a light beam component that is diffracted from the grating, from a first set of values to a second set of values, thereby achieving optical switching of the light beam from a first illuminated site to a second illuminated site. The time interval estimated for switching is of the order of 10 μsec or less for a (substrate) length shift of the order of 1 mm or less.

In another embodiment, a polynomially stepped, "chirped" grating is provided in which a sequence individual grating mirror component widths $d_n$ (n=1, 2, ..., N) vary according to a polynomial in the sequence number n (e.g., $d_n = d0 + d1 \cdot n$), and a sequence of grating equations is developed that, if satisfied, allows constructive interference of electromagnetic waves to provide equivalent diffracted waves with altered spectra, as compared with a conventional grating with uniform width reflective/transmissive ("r/t") components. Whereas, a conventional grating has diffraction properties that are substantially invariant under translation along the grating axis, the diffraction orders, wavelengths and angles for a chirped grating may vary with translation in a predictable manner.

Another embodiment of the invention provides a system including first and second diffraction gratings, positioned in a selected serial configuration to receive an incident light beam having a selected wavelength λ0, corresponding to a diffraction order m1 for the first grating (order m2 for the second grating). The incident beam is received and diffracted by a first grating having a first orientation, to produce a first beam component having a first propagation direction and diffraction order m1 determined by λ0. The diffracted first beam component (λ0) is received and diffracted by a second grating having a second orientation, to produce a second beam component having a second propagation direction and diffraction order m2 that is also determined by λ0, where the second grating orientation is approximately perpendicular to, or "transverse to" (neither parallel to nor perpendicular to), the first grating orientation. The second beam propagation direction varies with λ0 in such a manner that, within a selected wavelength interval $\lambda 1 \leq \lambda \leq \lambda 2$, no two incident light beam components, having respective representative wavelengths, λ' and λ" with |λ'−λ"| greater than a threshold difference Δλ(thr), will produce first and second light beam components having the same first and second beam propagation directions, and a difference in beam propagation directions will increase (preferably monotonically) with the wavelength difference |λ'−λ"|.

The first grating provides wavelength discrimination according to a first angular variable θ1, and the second grating provides wavelength discrimination according to a second angular variable θ2, where θ1 and θ2 are measured within two independently oriented planes. For example, θ1 and θ2 may be the azimuthal and polar angles for a sphere, measured relative to an xy-plane and relative to a zx-plane, respectively. The second grating can also sense changes in a physical parameter, such as position, temperature or pressure at that site.

DESCRIPTION OF BEST MODES OF THE INVENTIONS

Figure 1:
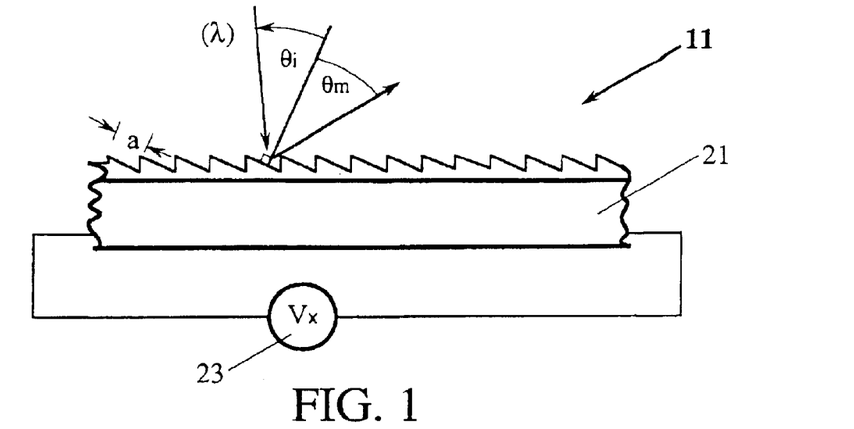
FIGS. 1, 6 and 7 illustrate three embodiments of the invention.

FIG. 1 illustrates an embodiment of the invention, in which a diffraction grating 11 is mounted on, attached to or part of a piezoelectric substrate 21 that is attached to a controllable voltage source 23. The diffraction grating 11 may be a conventional grating with uniform width r/t components oriented in one direction, or the grating 11 may be a modified grating of a type that is discussed in the following. The grating is preferably blazed to separate the diffraction orders appropriately. Diffraction gratings and the effects of blazing are discussed by E. Hecht, *Optics*, Third Edition, Addison Wesley, Reading Mass, pp. 465–475, and in other optics texts.

Where a conventional, non-blazed grating with uniform width r/t components is used, the grating equation for a transmission-grating or reflection-grating is expressed as $$d \cdot \{\sin \theta m - \sin \theta i\} = m\lambda, \qquad (1)$$

where d is grating r/t component width, $\theta i$ and $\theta m$ are angle of incidence and angle of diffraction, respectively, $\lambda$ is a representative wavelength of the diffracted light beam and m ($=0\pm 1, \pm 2, \ldots$) is a selected integer representing the diffraction order. Equation (1) is illustrated in FIG. 1.

Figure 2:
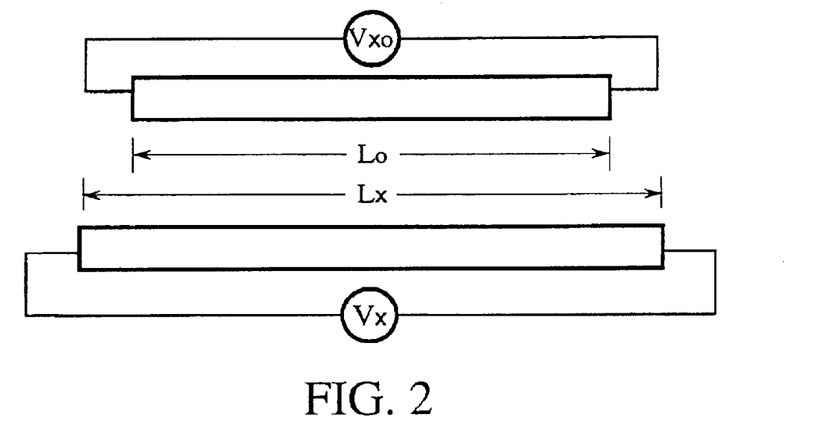
FIGS. 2 and 4 illustrate change in length in one, two and three directions of a piezoelectric substrate, in response to voltage changes

Grating action is governed by the grating equation (1) and depends parametrically on the r/t component width d and on the total number N of grating r/t components used in the grating apparatus. A piezoelectric (PZE) substrate will experience a change in length $\Delta L_x$ when a voltage applied to the substrate is changed from an initial value $V_{x0}$ to another value $V_x$ that is approximately proportional to $\Delta V_x = V_x - V_{x0}$:

$$\Delta L_x(sub) = L_x - L_{x0} = L_{x0} \cdot \alpha_x(sub) \cdot (V_x - V_{x0}) \qquad (2)$$

as illustrated in FIG. 2, where $\alpha_x(sub)$ is a non-zero value that is characteristic of the PZE substrate material chosen. Where the PZE substrate is attached to the grating, the grating material will partly resist undergoing a change of length so that the change in length $\Delta L_x(comb)$ of the combined substrate-plus-grating will have a smaller magnitude than the unencumbered change in length of the substrate alone:

$$|\Delta L_x(comb)| < |\Delta L_x(sub)|, \qquad (3)$$

and the difference of these two length values will depend upon the relative Young's moduli for the substrate and for the grating material. Through experiment or computation or both, a corresponding coefficient $\alpha_x$ can be determined for which $$\Delta L_x(comb) = L_x(comb) - L_{x0} = L_{x0} \cdot \alpha_x \cdot (V_x - V_{x0}) \qquad (4)$$

Where a change in voltage $\Delta V_x$ is applied rapidly to the PZE substrate, a change in length $\Delta L_x'$ of the combined substrate-plus-grating should also occur in a short time interval (believed to be between 1 μsec and 1 sec, including allowance of time for the substrate to "settle" after application of the voltage change). The resulting grating r/t component width after application of the voltage change should be approximately $$d' = d \cdot (1 + \Delta L_x' / L_{x0}). \qquad (5)$$

Figure 3:
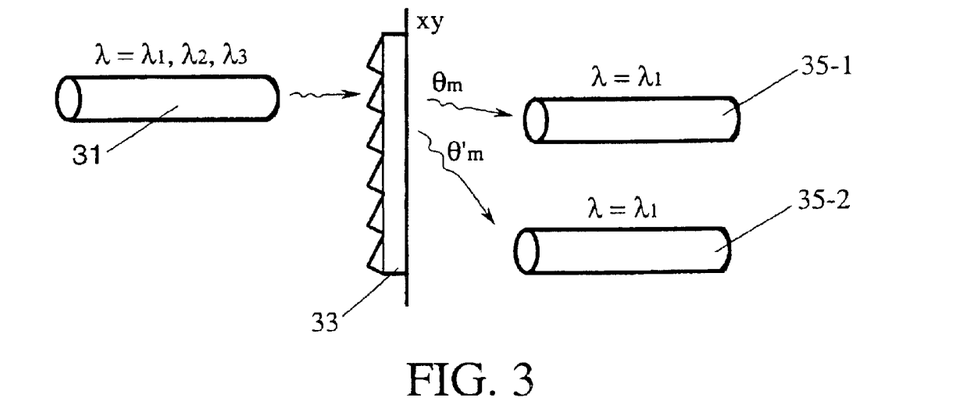
FIG. 3 illustrates use of the invention in switching between different optical fibers in a fiber cascade system.

By choosing the voltage change $\Delta V_x$ appropriately, the diffraction angle $\theta m$ corresponding to a given diffraction order m can be changed to another selected diffraction angle $\theta' m$ ($\approx \theta m$) so that a light beam having a selected (central) wavelength $\lambda 0$ will be diffracted at a different angle $\theta' m$ and, optionally, will be received at different light beam receiving sites, before and after the voltage change. This is illustrated in FIG. 3, where an incident light beam, produced by a source optical fiber 31, passes through a diffraction grating 33. A diffracted light beam component is received by an exposed end of a first optical fiber 35-1 before the voltage change and is received by an exposed end of a second, adjacent optical fiber 35-2 after the voltage change.

By combining Eqs. (1) and (5), a first grating equation $$d \cdot (1 + \Delta L_x / L_{x0}) \cdot \{\sin \theta' m - \sin \theta i\} = m \cdot \lambda 0, \qquad (6A)$$

applicable after the voltage change, is obtained, where $\theta' m$ is the new (changed) diffraction angle corresponding to order m. Equation (6A) indicates the change in diffraction angle ($\theta m \rightarrow \theta' m$) for a fixed (unchanged) light beam wavelength $\theta 0$. A second grating equation resulting from combining Eqs. (1) and (5) is $$d \cdot (1 + \Delta L_x / L_{x0}) \cdot \{\sin \theta m - \sin \theta i\} = m \cdot \lambda 0', \qquad (6B)$$

where the diffraction angle $\theta m$ is unchanged but the corresponding light beam wavelength is changed ($\lambda \rightarrow \lambda'$). Thus, the embodiment illustrated in FIG. 1 or FIG. 3 can be used to provide an arbitrarily tunable wavelength ($\lambda \rightarrow \lambda'$) associated with a particular diffraction order m (for fixed diffraction angle $\theta m$), or can be used to provide a change in the angle or light-receiving site associated with the order (for fixed wavelength $\lambda 0$).

A third grating equation, applicable after the voltage change, which has discontinuous or discrete solutions, is a change in the diffraction order ($m \rightarrow m'$) for fixed diffraction angle $\theta m$ and fixed wavelength $\lambda$:

$$d \cdot (1 + \Delta L_x / L_{x0}) \cdot \{\sin \theta m - \sin \theta i\} = m' \cdot \lambda. \qquad (6C)$$

However, Eq. (6C) will have only a limited number of discrete solutions, each corresponding to a particular quadruple of parameters (d, $\Delta L_x / L_{x0}$, $\theta i$, $\theta m$, $\lambda$).

A fourth grating equation allows a change in incidence angle $\theta i$ as a result of the voltage change, with no change in diffraction angle, diffraction order or wavelength:

$$(\Delta L_x / L_{x0}) \cdot \sin \theta m - (1 + \Delta L_x / L_{x0}) \cdot \sin \theta' i + \sin \theta i = 0. \qquad (6D)$$

The results of Eqs. (6A)–(6D) can be combined to provide a relationship between change in wavelength, change in diffraction angle, change in incidence angle and change in order:

$$d \cdot \{(1 + \Delta L_x / L_{x0}) \cdot \sin \theta m - \sin \theta m - (1 + \Delta L_x / L_{x0}) \cdot \sin \theta' i + \sin \theta i\} = m' \cdot \lambda' 0 - m \cdot \lambda 0. \qquad (6E)$$

These possibilities may be summarized as follows. In response to a change $\Delta V_x$ in applied voltage and a corresponding change $\Delta L_x$ in length ($\propto \Delta V_x$) of the grating r/t component width d, one or more of the following four modifications can occur: (1) the diffraction angle $\theta m$ corresponding to the original wavelength $\lambda$, to the original diffraction order m and to the original incidence angle $\theta i$ will change, as indicated in Eq. (6A), so that the diffracted beam component with fixed $\theta i$, $\lambda$ and m is now diffracted in a different angular direction $\theta' m$; (2) the wavelength $\lambda$ corresponding to the original diffraction angle θm, to the original diffraction order m and to the original incidence angle θi will change, as indicated in Eq. (6B), so that the diffracted beam component with fixed θm, θi and m has a different associated wavelength λ'; (3) the diffraction order m corresponding to the original diffraction angle θm, to the original wavelength λ and to the original incidence angle θi will change, as indicated in Eq. (6C), so that the diffracted beam component with fixed θm, θi, and λ has a different associated diffraction order m'; and (4) the incidence angle θi corresponding to the original wavelength λ, to the original diffraction order m and to the original diffraction angle θm will change, as indicated in Eq. (6D), so that the diffracted beam component with fixed θm, λ and m now corresponds to a different incidence angle θ'i. These four individual responses, plus combinations of two or more of these responses, provide a total of 15 possible responses to a voltage change.

Materials that are suitable for PZE responses to changes in impressed voltage differences in one, two or three directions include: quartz, tourmaline, Rochelle salt, ammonium dihydrogen phosphate (ADP), lithium sulphate, lead titanate, lead zirconate titanate, lead metaniobate, lead magnesium niobate, barium titanate ($BaTiO_z$; $3 \leq z \leq 4$), and modified/unmodified barium strontium titanate ($Ba_y Sr_{1-y} Ti_x M_{1-x} O_z$; $0 \leq x \leq 1$; $0 \leq y \leq 1$; $3 \leq z \leq 4$), where M is one or a combination of two or more of the following elements: M=Ta, Zr, Hf, V, Nb, Mo, W, Mn, Sc, Re, Al, Ga and Cr.

Figure 4:
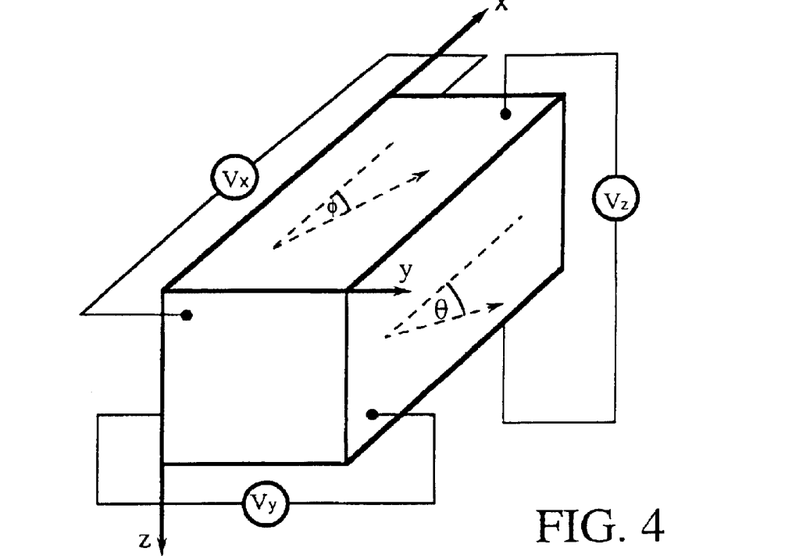

FIG. 4 illustrates some useful effects that can be generated when two or three perpendicularly or transversely oriented voltages, $V_x$, $V_y$ and $V_z$, are applied to a PZE substrate 41 having a diffraction grating 43 attached thereto. It is assumed that the PZE substrate material has non-zero PZE (linear) coefficients, $\alpha_x$, $\alpha_y$ and $\alpha_z$, that correspond to a change Δx in an x coordinate, a change Δy in a y coordinate and/or a change Δz in a z coordinate of an arbitrary point on the substrate 41, due to respective changes, $\Delta V_x$, $\Delta V_y$ and/or $\Delta V_z$, in the voltage differences, $V_x$, $V_y$ and/or $V_z$:

$$x \to x' = x + \Delta x = \{1 + \alpha_x(\Delta V_x/V_x)\}x, \quad (7A)$$

$$y \to y' = y + \Delta y = \{1 + \alpha_y(\Delta V_y/V_y)\}y, \quad (7B)$$

$$z \to z' = z + \Delta z = \{1 + \alpha_z(\Delta V_z/V_z)\}z. \quad (7C)$$

The coefficients $\alpha_x$, $\alpha_y$ and $\alpha_z$ may be different or may be the same; all that is required is that at least two of these PZE coefficients be non-zero.

The grating 43 is assumed to be initially oriented at an azimuthal angle φ0 relative to an x-axis of an xy-Cartesian coordinate system, as shown in FIG. 4, with $\Delta V_x = \Delta V_y = \Delta V_z = 0$. Where voltage changes $\Delta V_x$ and/or $\Delta V_y$ (at least one of which is non-zero) are now applied, with $\Delta V_z$ initially 0, the (x,y) coordinates of a point on the grating 43 will become (x',y',z), determined as in Eqs. (7A) and (7B), and the azimuthal angle in the xy-plane will become $$\phi 0 \to \phi', \quad (8)$$

$$\tan \phi' = \beta' \cdot \tan \phi 0, \quad (9)$$

$$\beta' = \{1 + \alpha_y(\Delta V_y/V_y)\}/\{1 + \alpha_x(\Delta V_x/V_x)\}. \quad (10)$$

The transformation (referred to a "quasi-rotation" herein) set forth in Eqs. (8)–(10) is not a true geometric rotation, which would correspond to $$x' \to x \cdot \cos(\Delta \phi) + y \cdot \sin(\Delta \phi), \quad (11A)$$

$$y' \to -x \cdot \sin(\Delta \phi) + y \cdot \cos(\Delta \phi), \quad (11B)$$

where Δφ is a change in azimuthal angle. However, the angular transformation indicated in Eqs. (8)–(10) provides a suitable rotation for a single line, such as a diffraction grating axis AA, in the xy-plane. (i) A "rotation" or (ii) a "twist" rotates all lines parallel to a selected line (i) within a plane, such as an xy-plane or (ii) in each of two independently oriented planes, such as the xy- and yz-planes.

If, for example, the voltage changes, $\Delta V_x$ and $\Delta V_y$, are chosen so that β=1, the result will be a pure dilatation $$x_i \to x_i' = x_i + \Delta x_i = \{1 + \alpha_x(\Delta V_x/V_x)\}x_i (i=1,2), \quad (12)$$

$$y_i \to y_i' = y_i + \Delta y_i = \{1 + \alpha_y(\Delta V_y/V_y)\}y_i (i=1,2), \quad (13)$$

$$L_{xy} \to L_{xy}' = L_{xy} + \Delta L_{xy} = \{(1+\alpha_x(\Delta V_x/V_x))^2(x2-x1)^2 + +(1+\alpha_y(\Delta V_y/V_y))^2(y2-y1)^2\}^{1/2}, \quad (14)$$

$$\alpha_x(\Delta V_x/V_x) = \alpha_y(\Delta V_y/V_y), \quad (15)$$

where $(x_1,y_1)$ and $(x_2,y_2)$ are the coordinates of a first end and a second end of the grating 43 in FIG. 4.

As another example, the voltage changes, $\Delta V_x$ and $\Delta V_y$, may be chosen so that the length $L_{xy}$ of the grating, and thus the width d of a grating r/t component, is unchanged and a pure quasi-rotation is implemented:

$$\phi' = \phi 0 + \Delta \phi = \tan^{-1}\{\beta' \cdot \tan \phi 0\}, \quad (16)$$

$$(x_2-x_1)^2(1+\alpha_x(\Delta V_x/V_x))^2 + (y_2-y_1)^2\{1+\alpha_y(\Delta V_y/V_y)\}^2 = ((x_2-x_1)^2 + (y_2-y_1)^2, \quad (17)$$

where $(x_1,y_1)$ and $(x_2,y_2)$ are the coordinates of a first end and a second end of the grating 43 in FIG. 4. Equations (16) and (17) determine the values of the parameter-weighted voltage changes, $\alpha_x \cdot \Delta V_x$ and $\alpha_y \cdot \Delta V_y$, required to implement the desired pure quasi-rotation, with no change in length $L_{xy}$. A pair of electrodes preferably covers most or all of the two corresponding opposed surfaces (e.g., x=x1 and x=x2). Where three voltage differences, $\Delta V_x$, $\Delta V_y$ and $\Delta V_z$, are impressed, at least one surface, on which the grating 43 is provided, will have to be left partly exposed to provide surface area for the grating. Typical values of the coefficients $\alpha_h$ (h=x, y, z) are $(100–600) \times 10^{-12}$ m/volt, and typical voltage differences are 50–1000 volts.

A polar angle θ0, shown in FIG. 4, will change from θ0 to θ when the changed voltages $V_x + \Delta V_x$ and $V_y + \Delta V_y$ are applied, even before the third voltage $V_z$ is changed, unless Eq. (15) is satisfied (zero dilatation):

$$\tan \theta' = (z_2-z_1)/\{(x_2'-x_1')^2 + (y_2'-y_1')^2\}^{1/2}$$

$$= (z2-z1)/\{(x_2-x_1)^2 (1+\alpha_x(\Delta V_x/V_x))^2 + (y_2-y_1)^2(1+\alpha_y (\Delta V_y/V_y))^2)\}^{1/2}$$

$$= \chi' \cdot \tan \theta 0, \quad (18)$$

$$\chi' = (1 + \{2\alpha_x(\Delta V_x/V_x) + \alpha_x^2(\Delta V_x/V_x)^2\}\cos^2 \phi 0 + \{2\alpha_y(\Delta V_y/V_y) + \alpha_y^2(\Delta V_y/V_y)^2\}\sin^2 \phi 0\}^{-1/2}. \quad (19)$$

Now assume that the third voltage $V_z$ is changed ($V_z \to V_z + \Delta V_z$), with $V_x$ and $V_y$ held at the already-changed values discussed in Eqs. (12)–(13). The coordinates of the first and second ends of the grating will then change from $(x_i', y_i', z_i)$ to $(x_i', y_i', z_i')$ with $$z_i \to z_i' = z_i + \Delta z_i = \{1 + \alpha_z(\Delta V_z/V_z)\} z_i \ (i=1,2). \quad (20)$$

The polar angle will then change from $\theta'$ to $\theta''$, according to $$\tan \theta'' = (z_2' z_1')/\{(x_2' - x_1')^2 +$$
$$(y_2' - y_1')^2\}^{1/2}$$
$$= (z2 - z1)(1 + \alpha_z$$
$$(\Delta V_z/V_z))/\{(x_2 - x_1)^2$$
$$(1 + \alpha_x(\Delta V_x/V_x))^2$$
$$+ (y_2 - y_1)^2 (1 + \alpha_y$$
$$(\Delta V_y/V_y))^2\}^{1/2}$$
$$= \chi'' \cdot \tan \theta 0, \quad (21)$$
$$\chi'' = (1 + \alpha_z(\Delta V_z/V_z)) \cdot \chi''. \quad (22)$$

The change in the trigonometric quantity $\tan \theta$ thus occurs in two stages:

$$\tan \theta 0 \to \chi' \cdot \tan \theta 0 \to (1 + \alpha_z(\Delta V_z/V_z)) \cdot \chi' \cdot \tan \theta 0 = \chi'' \cdot \tan \theta 0. \quad (23)$$

A combination of a change in $\tan \theta$ and in $\tan \theta$, can occur as the result of a change in any two voltages, such as $V_x$ and $V_y$, or as the result of a change in all three voltages, $V_x$, $V_y$ and $V_z$ and is referred to herein as a "twist." Note that a twist can occur where any two of the three voltage changes are applied.

Figure 5A:
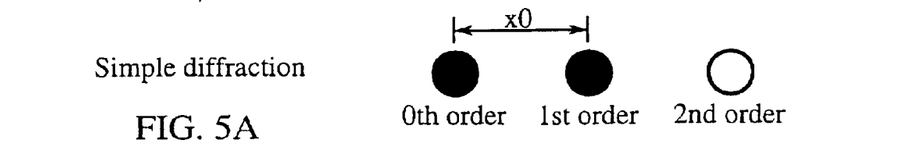
FIGS. 5A–5D illustrate effects on diffracted beam component footprints where the grating is dilated and/or rotated and/or twisted.
Figure 5B:
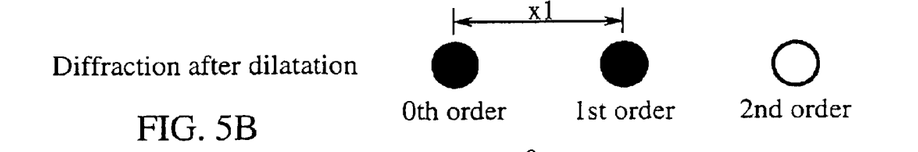
Figure 5C:
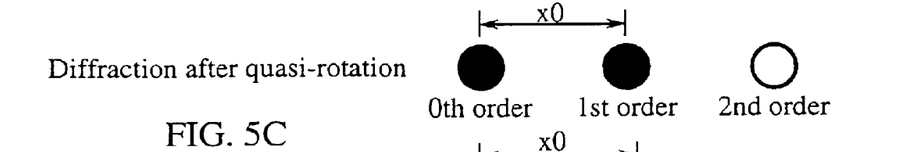
Figure 5D:
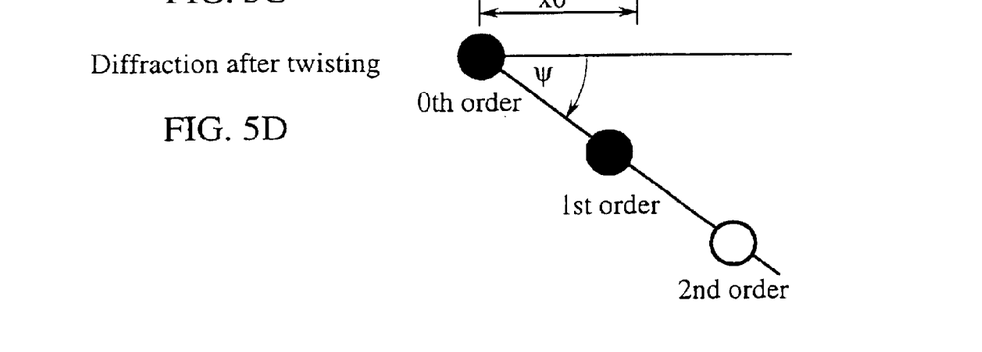

FIG. 5A illustrates a diffraction effect provided by a simple diffraction grating, with a fixed initial r/t component width d: beam component "footprints" corresponding to different diffraction orders are spaced apart by approximately equal distances (increasing slightly with increasing order m). FIG. 5B illustrates an effect on the diffracted beam component footprints of FIG. 5A when a pure dilatation is applied to the same grating: adjacent footprints are displaced relative to each other by an approximately equal distance ($\approx x1-x0$) that is approximately proportional to the change $\Delta L$ in length of the grating. This situation corresponds to the situation discussed in connection with Eq. (6A). FIG. 5C illustrates an effect on the diffracted beam component footprints in FIG. 5A when a pure quasi-rotation is applied to the same grating: adjacent footprints are translated (and possibly rotated) as a group, with little or no change in the distance between adjacent footprints. FIG. 5D illustrates an effect on the diffracted beam component footprints of FIG. 5A when a twisting action is applied to the same grating, which causes the grating to move in a third (z-) coordinate direction that is perpendicular to or transverse to the xy-plane shown in FIG. 3. Where a twisting action is applied, adjacent diffracted beam component footprints are displaced relative to each other and are rotated by a selected angle $\psi$, as shown in FIG. 5D.

Figure 6:
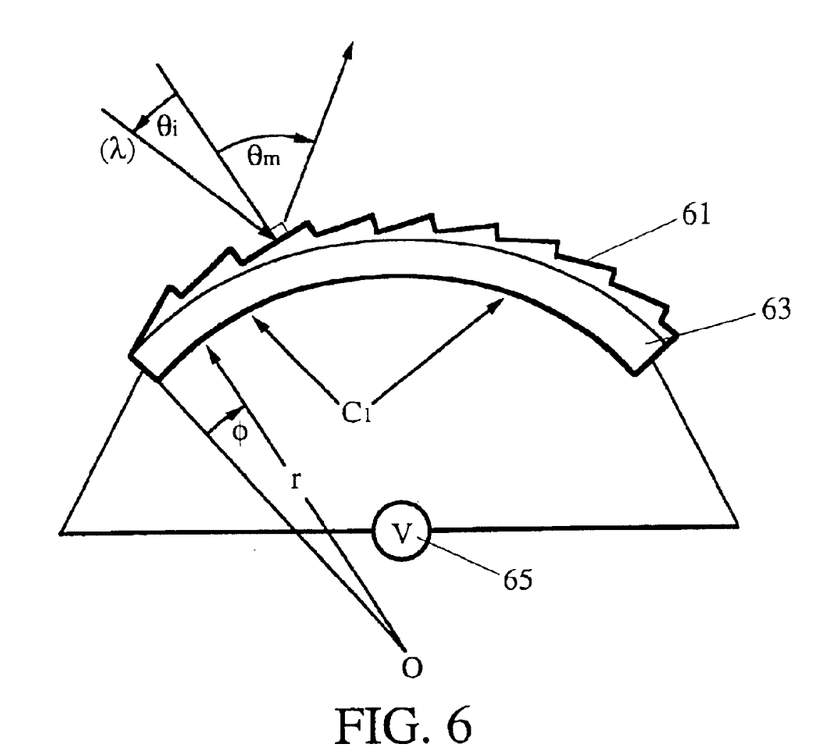

FIG. 6 illustrates another embodiment of the invention, in which the planar diffraction grating and substrate of FIG. 1 are replaced by a curvilinear diffraction grating 61 and matching substrate 63, connected to a controllable voltage source 65. Preferably, the particular curve C1 used is described by a simple analytical equation involving an azimuthal angle $\phi$, such as $$r(\phi) = \text{constant}, \quad (24A)$$

$$r(\phi) = r0 + r1 \cdot \phi \ (\text{linear spiral}) \quad (24B)$$

$$r(\phi) = (\sin \phi \{[\sin^2 \phi - 4 \cdot y0 \cdot k \cdot \cos^2 \phi]\}^{1/2}/(2 \cdot k \cdot \cos^2 \phi) (\text{parabola}), (24C)$$

$$r(\phi) = A + B \cdot \log(\phi). \quad (24D)$$

Here, the width d of each grating r/t component will not be constant but will vary with, for example, a central value of the azimuthal angle $\phi$ corresponding to each component. The grating equation (1) is replaced by a more complex equation that will vary with the choice of curvilinear shape function $r(\phi)$.

Figure 7:
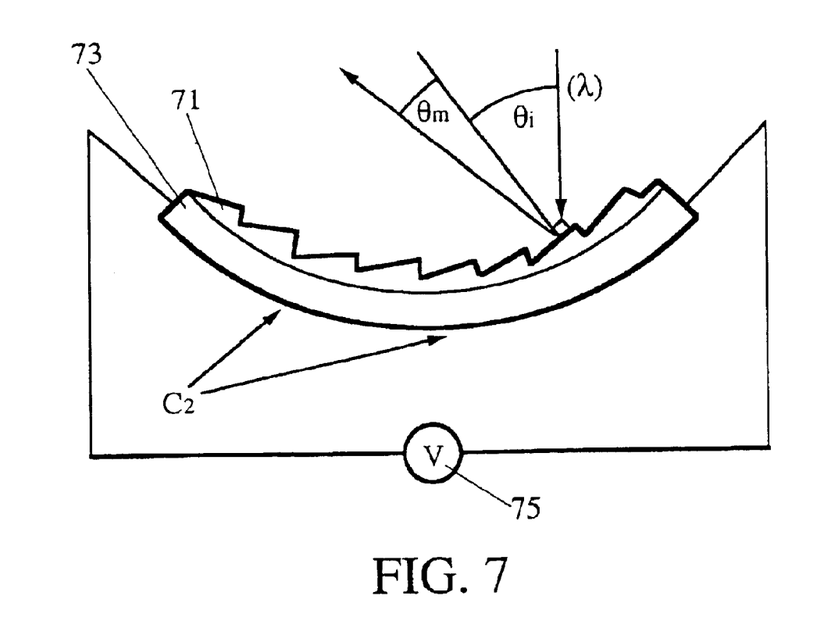

FIG. 7 illustrates another embodiment of the invention, in which the convex curve C1 of FIG. 6 is replaced by a concave curve C2.

A conventional grating has grating r/t components with uniform width d. Consider a polynomially stepped, "chirped" grating, for which the grating r/t component widths, $d = d_n$, (n=1, 2, ..., N) vary according to the index n, for example, as a polynomial in the index: $d_n = p(n)$, where $p(n)$ is a polynomial with selected coefficients. For example, a polynomially chirped grating, oriented in the x-direction, with r/t component widths given by $$d_n = p(n) = p_o + p_1 \cdot n + p_2 \cdot n^2 + p_3 \cdot n^3, \quad (25)$$

where the coefficients $p_k$ are constant, will have r/t component centers located at $$x = c_n = p_0 \cdot (n - 1/2) + p_1 \cdot n^2$$
$$/2 + p_2 \cdot n(2n^2 + 1)/6 + p_3$$
$$\cdot (n^4 + n^2)/4 = -p_0/2 +$$
$$(p_0 + p_2/6) \cdot n + (p_1/2 + p_3$$
$$/4) \cdot n^2 + (p_2/3) \cdot n^3 +$$
$$(p_3/4) \cdot n^4. \quad (26)$$

A conventional grating with uniform r/t component widths corresponds to $p_1 = p_2 = p_3 = 0$.

Figure 8:
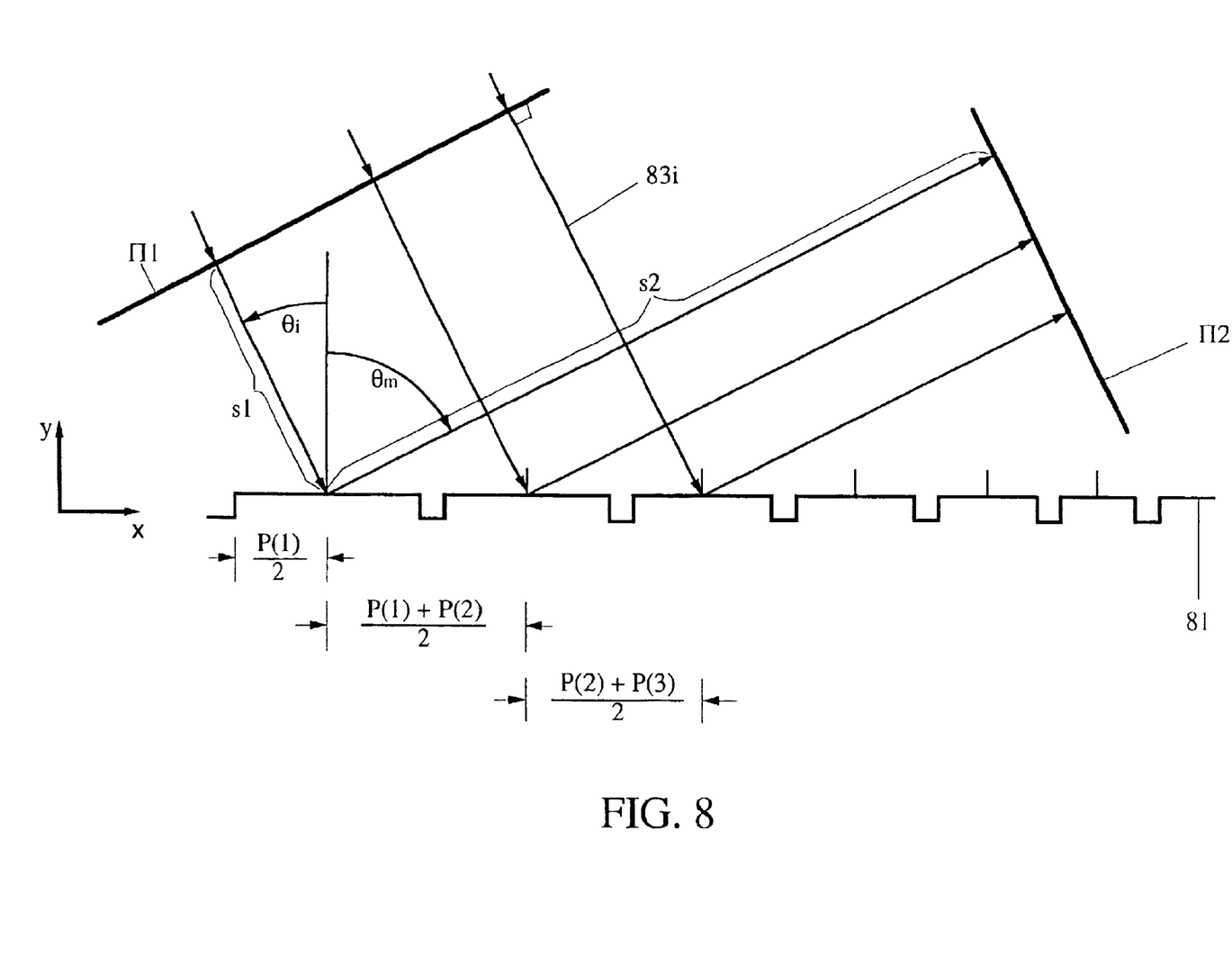
FIG. 8 illustrates diffraction according to a polynomially stepped chirped grating.

FIG. 8 illustrates (reflective) diffraction of a light beam 83$i$ at a chirped grating 81, with an incidence angle $\theta i$ and a diffraction angle $\theta m$ corresponding to a diffraction order m and a diffracted wavelength $\lambda = \lambda_m$. The light beam diameter must permit the beam to illuminate several grating r/t components (preferably, at least 10) at the same time. In the xy-plane shown in FIG. 8, a first plane $\Pi 1$ of wavefronts of the incident light beam is diffracted at the grating 81 and interferes constructively at a second plane $\Pi 2$. The first and second planes, $\Pi 1$ and $\Pi 2$, are defined by the respective equations in the xy-plane $$\Pi 1: y = H1(x) = (x - x1') \cdot \tan \theta i, \quad (27A)$$

$$\Pi 2: y = H2(x) = (x2' - x) \cdot \tan \theta m \quad (27B)$$

An incident light beam ray 83$i$ is moves through the plane $\Pi 1$, and a portion thereof is received at or near the center of one of the grating r/t components (no. n), with center location $x = c_n$ given in Eq. (26). The total wave is diffracted and is received at the plane $\Pi 2$. The total distance traveled by this ray in moving from the plane $\Pi 1$ to the grating r/t component (no. n) to the plane $\Pi 2$ is $$\Delta s = s1 + s2 = (c_n - x1') \sin \theta i + (x2' - c_n) \sin \theta m. \quad (28)$$

For each integer index value n the equality $$\Delta s = M \cdot \lambda / \eta(\lambda) \quad (29)$$

should be satisfied to provide constructive interference at the plane Π2, where M is an integer corresponding to diffraction order, λ is a representative wavelength of the ray and η(λ) is the refractive index of the ambient medium at that wavelength.

Where the center-to-center distance, $\Delta c_n = c_{n+1} - c_n$, between adjacent r/t components is constant (independent of the integer n), corresponding to a conventional grating with uniform width r/t components, an altered form of the conventional grating equation, $$(p_0 - 2 \cdot x'1) \sin \theta i + (2 \cdot x'2 - p_0) \sin \theta m = 2M \cdot \lambda / \eta(\lambda), \quad (30)$$

is recovered, where the x'1 and x'2 terms are arbitrary and can be ignored.

Where the r/t component widths are given by $p(n) = p_0 + p_1 \cdot n + p_2 \cdot n^2 + p_3 \cdot n^3$, corresponding to a cubically stepped, chirped grating, the basic grating equation becomes $$\{p_0/2 + (p_0 + p_2/6) \cdot n + (p_1/2 + p_3/4) \cdot n^2 + (p_2/3) \cdot n^3 + (p_3/4) \cdot n^4\}(\sin \theta i - \sin \theta m) - x'1 \cdot \sin \theta i + x'2 \cdot \sin \theta m = M \cdot \lambda / \eta(\lambda). \quad (31)$$

Ideally, this is true for every integer n=1, 2, ..., N, and terms involving different powers of n can be collected and combined. This requires that $$p_0 \cdot (\sin \theta i - \sin \theta m) = 2M0 \cdot \lambda/\eta, \quad (32\text{-}0)$$

$$n \cdot (p_0 + p_2/6) \cdot (\sin \theta i - \sin \theta m) = M1 \cdot \lambda/\eta, \quad (32\text{-}1)$$

$$n^2 \cdot (p_1/2 + p_3/4) \cdot (\sin \theta i - \sin \theta m) = M3 \cdot \lambda/\eta, \quad (32\text{-}3)$$

$$n^4 \cdot (p_3/4) \cdot (\sin \theta i - \sin \theta m) = M4 \cdot \lambda/\eta, \quad (32\text{-}4)$$

where M0, M1, M2, M3 and M4 are appropriate integers, corresponding to the particular integer n, and λ and η (λ) are assumed fixed. Equations (32-0) through (32-4) are linear in the coefficients p0, p1, p2 and p3 and can be sequentially solved for these quantities. However, these relations involve five equations for four unknowns and, thus may be over-prescribed. Over-prescription appears to be present for any polynomial of degree at least equal to 1 in Eq. (25). Possibly, no more than four of the five Eqs. (32-j) (=0–4) can be satisfied simultaneously.

One interpretation here is that diffracted beamlets from less than all of the r/t components contribute to diffraction of a particular diffraction order, when a polynomially chirped grating is used. In this instance, it is usually preferable to satisfy the lower order relations, such as Eqs. (32-0) through (32-3). The optical intensity of a particular diffraction order for a chirped diffraction grating is likely to be less than the corresponding optical intensity for a conventional grating, because not all r/t components contribute to this diffraction order. As the grating 81 and incident beam 83i are translated relative to each other, the particular r/t components that contribute to a particular grating order can change so that one or more of the diffraction angle, the order and the wavelength can change in the defining grating equation(s). One effect of this is that, as the grating 81 and incident beam 83i are translated relative to each other by a distance Δx, the observed dominant diffraction orders and the distance Δx correspond to each other in a 1-1 manner.

A polynomially stepped, chirped grating can be used alone or can be combined with a PZE substrate shown in FIGS. 1, 2 and 4.

Figure 9A:
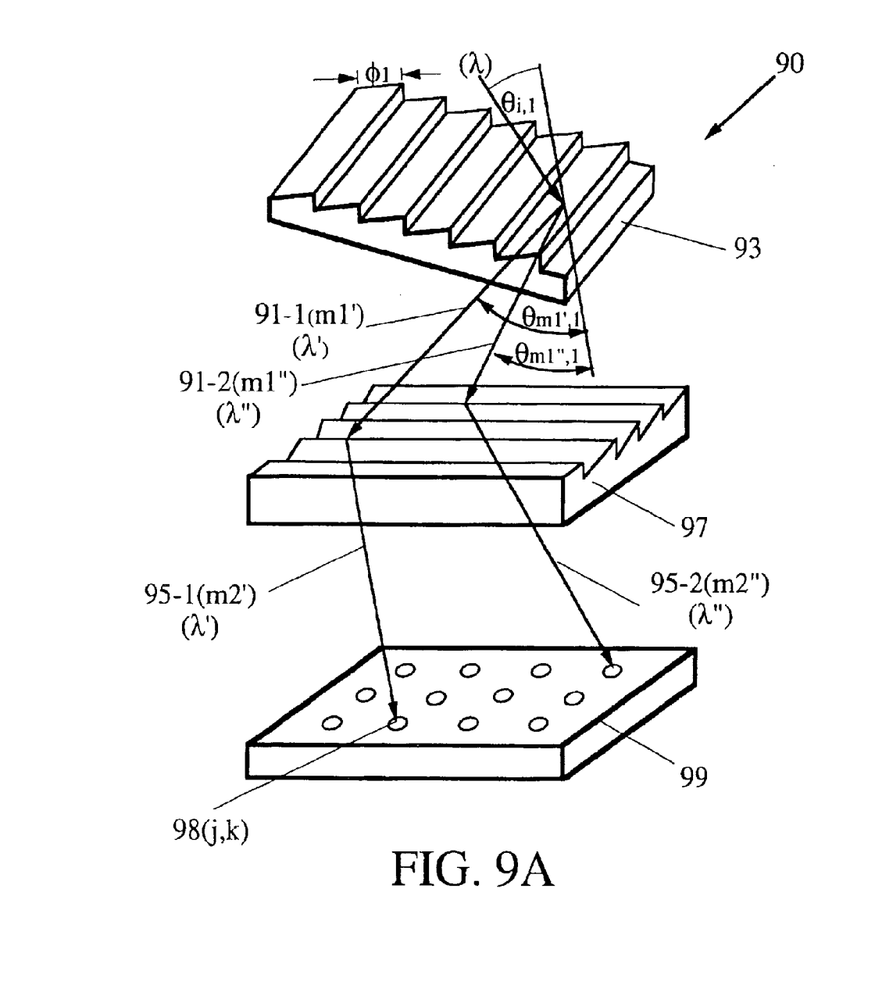
FIGS. 9A/9B and 10 illustrate two embodiment that use two gratings that sequentially receive a selected wavelength component of a light beam.

In another embodiment 90 of the invention, illustrated to FIG. 9A, an incident or initial beam 91-0 having a representative wavelength λ approaches a first diffraction grating 93 with a first incidence angle $\theta_{i,1}$ and is diffracted as shown. First and second wavelength components (λ' and λ") of the first diffracted beam 91-1 have respective diffraction orders m=m1' and m=m1" and have corresponding first diffraction angles $\theta_{m1',1}$ and $\theta_{m1",1}$, where the order m1 and the first diffraction angle $\theta_{m1,1}$ vary with the wavelength λ. The first grating r/t components have substantially constant widths d1, and the various physical quantities are related by first grating equations $$d1 \cdot \{\sin \theta_{i,1} - \sin \theta_{m1',1}\} = m1 \cdot \lambda', \quad (33\text{A})$$

$$d1 \cdot \{\sin \theta_{i,1} - \sin \theta_{m1",1}\} = m1" \cdot \lambda". \quad (33\text{B})$$

The first and second components, 91-1(m1') and 91-2(m1"), of the first diffracted beam propagate in a direction determined in part by the respective diffraction angles, $\theta_{m1',1}$ and $\theta_{m1",1}$ are received and diffracted by a second, transversely oriented diffraction grating 97 and are diffracted as first and second components, 95-1(m2') and 95-2(m2"), of a second diffracted beam. The first component of the second diffracted beam 95-1(m2') has diffraction order m=m2' (which may be the same as, but is generally different from, the order m1') and has a corresponding second diffraction angle $\theta_{m2',2}$ where the order m2' and the second diffraction angle $\theta_{m2',2}$ vary with the wavelength λ'. The second component of the second diffracted beam 95-2(m2") has diffraction order m=m2" (which may be the same as, but is generally different from, the order m1") and has a corresponding second diffraction angle $\theta_{m2",2}$, where the order m2" and the second diffraction angle $\theta_{m2",2}$ vary with the wavelength λ".

The beam incidence angle $\theta_{i,2}$ at the second grating 97 can be varied, by orienting the second grating in space, and this incidence angle will be different for each of the first and second components, 91-1(m1') and 91-2(m1"), of the first diffracted beam. Preferably, the second grating 97, shown in an end view in FIG. 9A, is transversely oriented, relative to the direction of orientation of the first grating 93, so that each of the first and second components, 91-1(m1') and 91-2(m1"), is received at the second grating 97. The second grating r/t components have substantially constant widths d2, and the various physical quantities are related by second grating equations $$d2 \cdot \{\sin \theta_{i',2} - \sin \theta_{m2',2}\} = m2' \cdot \lambda', \quad (34\text{A})$$

$$d2 \cdot \{\sin \theta_{i",2} - \sin \theta_{m2",2}\} = m2" \cdot \lambda". \quad (34\text{B})$$

Here $\theta_{i',2}$ and $\theta_{i",2}$ are the (different) incidence angles at the second grating 97 corresponding to the first and second components, 91-1(m1') and 91-2(m1"), of the first diffracted beam. The wavelength value λ(=λ' or λ") of the component (first or second) will be the same for each of the first and second gratings, 93 and 97, but the diffraction orders, m1 (=m1' or m1") and m2 (=m2' or m2"), may be the same as, or may differ from, each other.

Figure 9B:
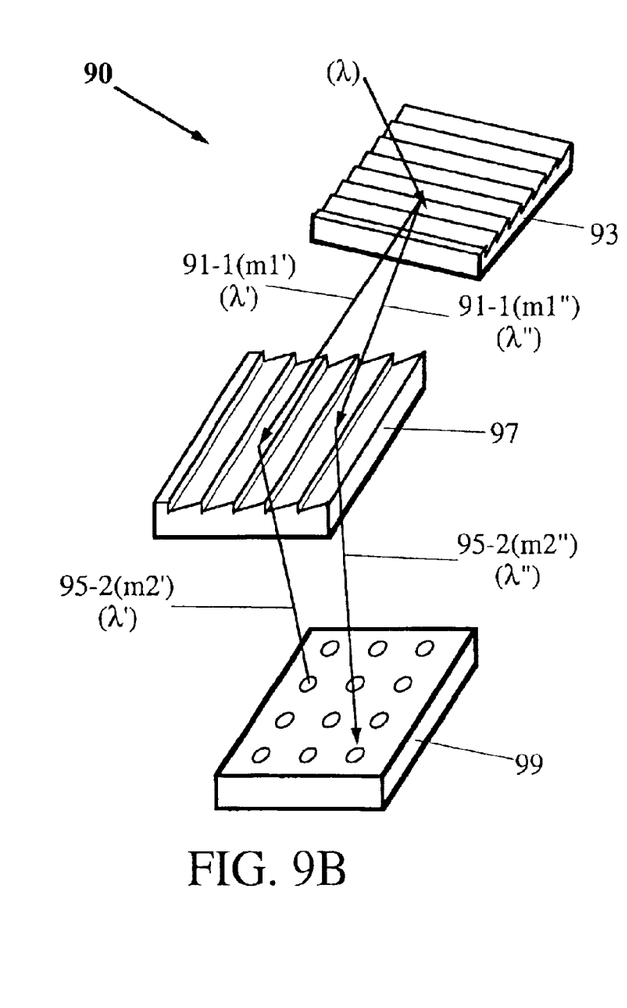

FIG. 9B is a second perspective view of the embodiment shown in FIG. 1A, but now viewed end-on relative to the first grating 93. FIG. 1A best illustrates the relationship of the incident beam 91-0 and the first and second components, 91-1(m1') and 91-2(m1"), of the first diffracted beam relative to the first grating 93, showing the first incidence angle $\theta_{i,1}$ and the first diffraction angles $\theta_{m1',1}$ and $\theta_{m1",1}$ in an approximate side view. FIG. 9B best illustrates the relationship of first and second components, 91-1(m1') and 91-2(m1"), of the first diffracted beam and the first and second components, 95-1(m2') and 95-2(m2"), of the second diffracted beam relative to the second grating 97, showing the second incidence angles, $\theta_{i',2}$ and $\theta_{i",2}$, and the second diffraction angles, $\theta_{m2',2}$ and $\theta_{m2",2}$, in an approximate side view.

The first and second components, 95-1(m2') and 95-2 (m2"), of the second diffracted beam propagate in final directions, with propagation angles ($\phi(\lambda),\theta(\lambda)$) determined in part by the corresponding first and second grating equations, (33A/B) and (34A/B), and are received by light-sensitive elements 98(j,k) of a light detector, optical switch, a spectrophotometer, or other light-sensitive transducer 99, where the location of the particular transducer element, (j=j($\lambda$),k=k($\lambda$)), is determined by the locations and relative orientations of the first and second gratings, 93 and 97, and of the detector 99, by the wavelength $\lambda$, and by the beam propagation angles ($\phi(\lambda),\theta(\lambda)$). For fixed quantities d1, $\theta_{i,1}$ and m1 (=m1' or m1"), as $\lambda$ increases (or decreases), the first diffraction angle $\theta_{m1,1}$ must increase (or decrease) correspondingly, according to Eqs. (33A) and (33B); and similarly for the second diffraction angle $\theta_{m2,2}$ according to Eqs. (34A) and (34B). These variations with $\lambda$ of the first and second diffraction angles, $\theta_{m1,1}$ and $\theta_{m2,2}$, will occur within a selected wavelength interval, whose maximum size is set by a requirement that no "ghost" diffraction beams occur, wherein two distinct light beam wavelengths would otherwise produce the same diffracted beam propagation angles ($\phi(\lambda),\theta(\lambda)$).

These variations of $\theta_{m1,1}$ and $\theta_{m2,2}$, and thus ($\phi(\lambda),\theta(\lambda)$ with $\lambda$ allow a user to specify a sequence of wavelengths $\{\lambda 1, \lambda 2, \ldots, \lambda Q\}$ with $\lambda(q+1)-\lambda q \geq \Delta\lambda(thr)$ (a selected positive threshold wavelength difference) and to position a sequence of transducer elements 98(j($\lambda$q),k($\lambda$q)) on the surface of the detector 99 so that the element 98(j($\lambda$q),k($\lambda$q)) receives only a (doubly-diffracted) light beam having the wavelength $\lambda=\lambda$q and does not receive a light beam having a wavelength $\lambda=\lambda$q' with q'$\neq$q. In this configuration, each of the sequence of transducer elements 98(j($\lambda$q),k($\lambda$q)) receives, and is activated by, a light beam having only one of the wavelengths $\lambda=\lambda$q, from among the sequence of wavelengths $\{\lambda 1, \lambda 2, \ldots, \lambda Q\}$. The embodiment illustrated in FIGS. 9A and 9B thus serves as a wavelength discriminator for the sequence of wavelengths $\{\lambda 1, \lambda 2, \ldots, \lambda Q\}$. The centers of adjacent transducer elements 98(j($\lambda$q),k($\lambda$q)) on the surface of the detector 99 may not be equidistantly spaced and may not lie on a straight line on this surface. In a general situation, these centers 98(j($\lambda$q),k($\lambda$q)) may lie at irregularly spaced intervals along a curvilinear segment on a surface of the transducer 99.

The system 90 in FIGS. 9A/9B can serve as an optical switch, providing a yes/no decision on whether a particular 98(j,k) is, or is not, illuminated by the twice-diffracted beam. Alternatively, the system 90 can determine which, if any, of two or more wavelength components is present in the incident light beam 91-0.

Figure 10:
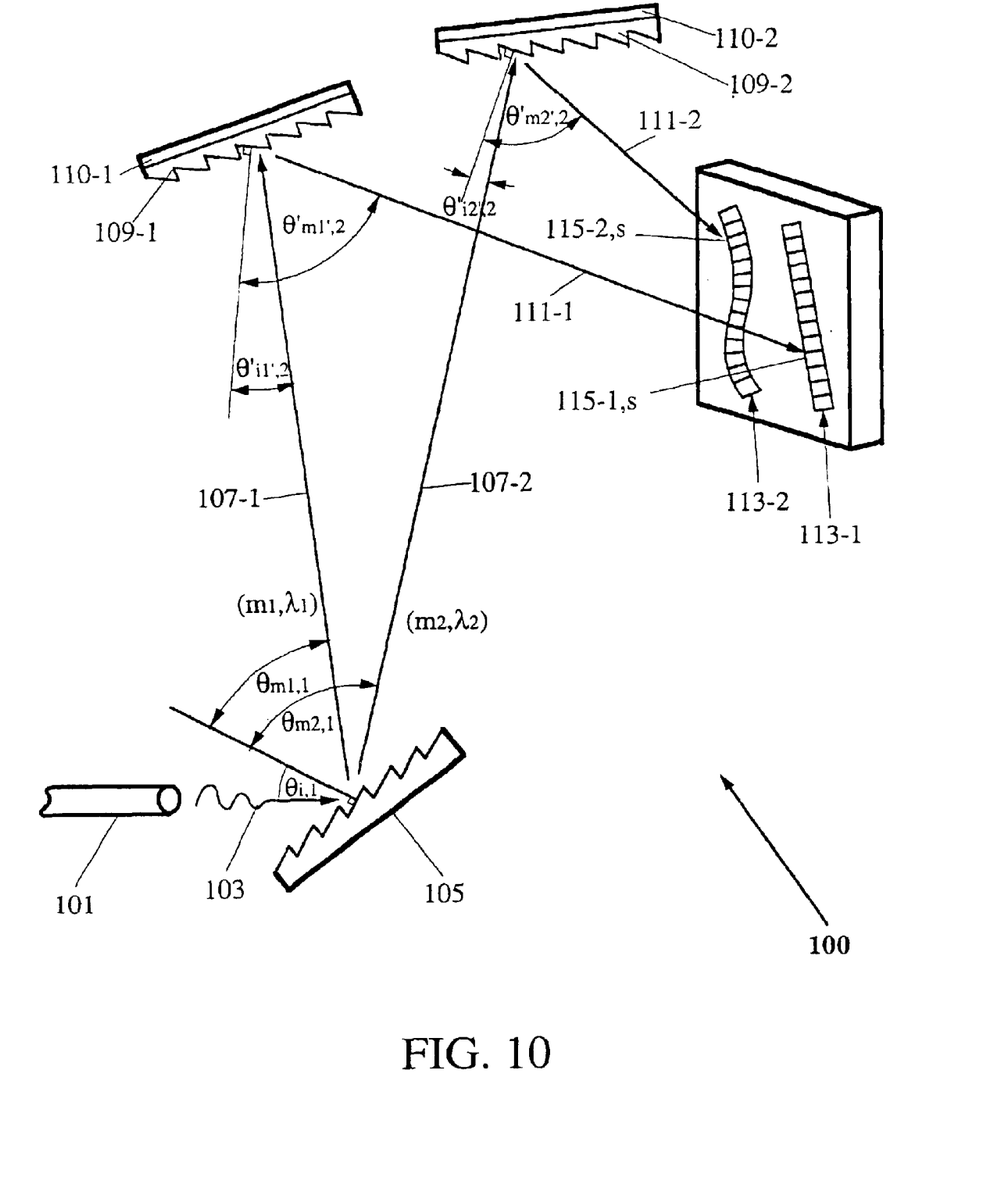

In another embodiment 100 of the invention, illustrated in FIG. 10, an intense multi-wavelength light source 101 provides a light beam 103, having P spaced apart wavelength components $\lambda_p$ (p=1, ..., P; P$\geq$2), that is received by a first diffraction grating 105. Each component, corresponding to a wavelength $\lambda_p$, is diffracted in a different direction from the first grating 105, according to a first grating equation $$d \cdot \{\sin \theta_{mp,1} - \sin \theta_{i,1}\} = mp \cdot \lambda_p, \quad (35)$$

where mp is a diffraction order corresponding to the wavelength $\lambda_p$. The light beam component with wavelength $\lambda_p$ emerges from the first grating 105 as a once-diffracted light beam 107-p, which is received by a sensor grating 109-p. Each of the sensor gratings 109-p is responsive to change in a physical parameter, such as grating location, grating angular orientation, pressure exerted on a substrate that carries the grating, or local temperature, experienced by or at the sensor grating 109-p. Any two of the sensor gratings may be responsive to change in the same physical parameter, or two changes in different physical parameters. The once-diffracted light beam 107-p is diffracted at the sensor grating 109-p and becomes a twice-diffracted light beam 111-p that propagates to, and is received by, one or more of a linear or curvilinear array 113-p of light-receiving elements 115-p,s (s=1, ..., $S_p$; $S_p \geq 2$) that are preferably contiguous. The particular light-receiving element 115-p,s that receives the twice-diffracted light beam 111-p indicates a small range of a change, if any, in the corresponding physical parameter experienced by or at the sensor grating 109-p. Each sensor grating 109-p may be parallel to, perpendicular to or transverse to the first grating 105, as desired.

The diameter d(115-p,s) of each light-receiving element of the array 113-p may be many times the lateral diameter d(111-p) of the twice-diffracted light beam 111-p (d(115-p,s)>>d(111-p)) so that the twice-diffracted beam 111-p is received at only one of the elements 115-p,s with a probability close to one. Alternatively, the d(115-p,s) of each light-receiving element of the array 113-p may be larger than, but approximately the same size as, the lateral diameter d(111-p) of the twice-diffracted light beam 111-p (d(115-p,s)>d(111-p)) so that the twice-diffracted beam 111-p can overlap at most two contiguous light-receiving elements, 115-p,s and 115-p,(s+1). In either event, receipt of some light by the element 115-p,s indicates a small range of a change, if any, in the corresponding physical parameter experienced by or at the sensor grating 109-p.

If the physical parameter, whose value is sensed by the sensor grating 109p, is (1) location in a selected direction or (2) angular orientation, the grating 109-p is positioned so that a change in this location or angular orientation will produce a change in a second diffraction angle $\theta'_{mp',2}$ and/or in a second diffraction order mp' associated with the twice-diffracted light beam 111-p, according to a grating equation $$d_p \cdot \{\sin \theta'_{mp',2} - \sin \theta'_{ip',2}\} = mp' \cdot \lambda_p. \quad (36)$$

Here, a change in at least one of the parameters $\theta'_{mp',2}$, $\theta'_{ip',2}$ and mp' accompanies the change in the physical parameter (location or angular orientation).

If the physical parameter is temperature, the sensor grating is positioned so that a change in local temperature will produce a change in the width $d_p$ of the r/t component in the sensor grating 109-p or the incidence angle $\theta'_{ip',2}$, as manifested in the sensor grating equation (36). Preferably, the sensor grating 109-p is positioned on a substrate 110-p that has a relatively high linear thermal expansion coefficient (e.g., $\alpha(therm) \geq 10^{-5}$). As the local temperature increases, at least one of the parameters, $d_p$ and $\theta'_{ip',2}$, changes, which causes the diffraction angle $\theta'_{mp',2}$ to change accordingly, for fixed $\lambda_p$.

If the physical parameter is fluid pressure, the sensor grating 109-p is positioned on a membrane that responds to change in pressure by changing the local shape and/or location of the membrane, with an accompanying change in at least one of the parameters $\theta'_{mp',2}$, $\theta'_{ip',2}$ and mp'.

The system 100 in FIG. 10 can serve as an optical switch associated with any one or more of the sensor gratings 109-p, by determining whether a particular light-receiving element 115-p,s is, or is not, illuminated by the twice-diffracted light beam 111-p (a yes/no decision). Alternatively, the system 100 can serve as an indicator of the present range (or change in range) of a physical parameter associated with one or more of the sensor gratings 109-p.

What is claimed is:

1. A method for controlling a light beam, the method comprising:

providing a diffraction grating, attached to or part of a piezoelectric substrate, having an initial substrate length and being connected to a controllable voltage source having an initial first voltage difference in a selected direction across the substrate;

directing a beam of light, having at least a selected wavelength $\lambda$, at the grating at a selected incidence angle and receiving a first diffracted light beam component of a selected diffraction order m containing the wavelength $\lambda$ at a first light-receiving site;

changing the first voltage difference at the first voltage source by a selected first voltage change amount $\Delta V1$ and permitting the substrate length to change by a selected first length change amount $\Delta L1$ in the selected direction, whereby at least one of the following occurs, after the first voltage change; (1) the first diffracted light beam component is received at a selected second light-receiving site, different from the first site, (2) a second diffracted light beam component of order m, containing a second wavelength $\lambda'$ but not the wavelength $\lambda$, is received at the first site, (3) a third diffracted light beam component of order m', with m'≠m, containing at least one of the first and second wavelengths, is received at at least one of the first site and the second site, and (4) a fourth diffracted light beam component, having an incidence angle different from the selected incidence angle and containing at least one of the first and second wavelengths, is received at at least one of the first site and the second site;

providing a second controllable voltage source having an initial second voltage difference across the substrate in a second selected direction that is transverse or perpendicular to the first direction; and changing the second voltage difference at the second voltage source by a selected voltage change amount $\Delta V2$ that is chosen so that at leas one of the following occurs: (i) the substrate length changes by a selected second length change amount $\Delta L2$ in the second direction, and (2) a selected axis of the grating is rotated by a selected angle change amount $\Delta\phi$ in a selected plane of the substrate.

2. The method of claim 1, further comprising providing said substrate with at least one planar surface, and providing said grating on the at least one planar surface.

3. The method of claim 1, further comprising providing as said piezoelectric substrate a material drawn from the group consisting of quartz, tourmaline, Rochelle salt, ammonium dihydrogen phosphate (ADP), lithium sulphate, lead titanate, lead zirconate titanate, lead metaniobate, lead magnesium niobate, barium titanate ($BaTiO_z$; $3 \leq z \leq 4$), and modified/unmodified barium strontium titanate ($Ba_ySr_{1-y}Ti_xM_{1-x}O_z$; $0 \leq x \leq 1$; $0 \leq y \leq 1$; $3 \leq z \leq 4$), where M is one or a combination of two or more of the following elements: M=Ta, Zr, Hf, V, Nb, Mo, W, Mn, Sc, Re, Al, Ga and Cr.

4. The method of claim 1, further comprising providing said substrate with a substrate material that is substantially transparent to said wavelength $\lambda$.

5. The method of claim 1, further comprising, providing a third controllable voltage source having an initial third voltage difference across said substrate in a third selected direction that is transverse or perpendicular to said first direction and second direction; and changing the third voltage difference at the voltage source by a selected voltage change amount $\Delta V3$ that is chosen so that the substrate length changes by a selected third length change amount $\Delta L3$ in the third direction.

6. The method of claim 1, further comprising choosing said second voltage change amount $\Delta V2$ so that said substrate length in a direction of said grating axis is substantially unchanged relative to said substrate length before application of said first and second voltage changes, $\Delta V1$ and $\Delta V2$.

7. The method of claim 1, further comprising said grating as a polynomlally stepped, chirped grating.

8. The method of claim 7, further comprising choosing said polynomially stepped grating from a group of gratings consisting of a linearly stepped grating, a quadratically stepped grating and a cubically stepped grating.

9. A system for controlling a light beam, the system comprising:

a diffraction grating, attached to or part of a piezoelectric substrates having an initial substrate length, where the grating is positioned to receive a beam of light, having at least a selected wavelength $\lambda$, at a light-receiving site of the grating at a selected incidence angle and to provide a first diffracted light beam component of a selected order m containing the wavelength $\lambda$; and a first controllable voltage source, connected in a selected direction across the substrate and having an initial voltage difference, where the voltage difference is changed by a selected fit voltage change amount $\Delta V1$ to cause the substrate length to change by a selected first length change amount $\Delta L1$ in the selected direction, whereby at least one of the following occurs, after the first voltage change: (1) the first diffracted light beam component is received at a selected second light-receiving site, different from the first site, (2) a second diffracted light beam component of order m, containing a second wavelength $\lambda'$ but not the wavelength $\lambda$, is received at the first site, (3) a third diffracted light beam component of order m', with m'≠m, containing at least one of the first and second wavelengths, is received at at least one of the first site and the second site, and (4) a fourth diffracted light beam component, having an incidence angle different from the selected incidence angle and containing at least one of the first and second wavelengths, is received at at least one of the first site and the second site;

a second controllable voltage ource having an initial second voltage difference across the substrate in a second selected direction that is transverse or perpendicular to the first direction; and wherein the second voltage difference at the second voltage source can be changed by a elected voltage change amount $\Delta V2$ that is chosen so that at least one of the following occurs: (i) the substrate length changes by a selected second length change amount $\Delta L2$ in the second direction, and (2) a selected axis of the grating is rotated by a selected angle change amount $\Delta\phi$ in a selected plane of the substrate.

10. The system of claim 9, wherein said substrate is provided with at least one planar surface, and said grating is provided on the at least one planar surface.

11. The system of claim 9, wherein said piezoelectric substrate is drawn from the group or materials consisting of quartz, tourmaline, Rochelle salt, ammonium dihydrogen phosphate (ADP), lithium sulphate, lead titanate, lead zirconate titanate, lead metaniobate, lead magnesium niobate, barium titanate ($BaTiO_z$; $3 \leq 5 \leq z \leq 4$), and modified/unmodified barium strontium titanate ($Ba_y Sr_{1-y} Ti_x M_{1-x} O_z$; $0 \leq x \leq 1$; $0 \leq y \leq 1$; $3 \leq z \leq 4$), where M is one or a combination of two or more of the following elements: M=Ta, Zr, Hf, Y, Nb, Mo, W, Mn, Sc, Re, Al, Ga and C.

12. The system of claim 9, wherein said substrate is provided with a substrate material that is substantially transparent to said wavelength $\lambda$.

13. The system of claim 9, further comprising:

a third controllable voltage source having an initial third voltage difference across said substrate in a third selected direction that is transverse or perpendicular to said first direction and to said second direction, where the third voltage difference is changed by a selected voltage change amount $\Delta V3$, chosen so that the substrate length changes by a selected third length change amount $\Delta L3$ in the third direction.

14. The system of claim 9, wherein said second voltage change amount $\Delta V2$ is chosen so that said substrate length in a direction of said grating axis is substantially unchanged relative to said substrate length before application of said first and second voltage changes, $\Delta V1$ and $\Delta V2$.

15. The system of claim 9, wherein said grating is a polynomially stepped, chirped grating.

16. The system of claim 15, wherein said polynomially stepped grating is chosen from a group of gratings consisting of a quadratically stepped grating and a cubically stepped grating.

17. A method for controlling a light beam, the method comprising:

providing a diffraction grating, attached to or part of a piezoelectric substrate, having an initial substrate length and being connected to a controllable voltage source having an initial voltage difference in a selected direction across the substrate;

providing the substrate with a selected curved surface, and providing the grating on the curved surface;

directing a beam of light, having at least a selected wavelength $\lambda$, at the grating at a selected incidence angle and receiving a first diffracted light beam component of a selected diffraction order m containing the wavelength $\lambda$ at a first light-receiving site; and changing the voltage difference at the voltage source by a selected voltage change amount $\Delta V1$ and permitting the substrate length to change by a selected length change amount $\Delta L1$ in the selected direction, whereby at least one of the following occurs, after the voltage change: (1) the first diffracted light beam component is received at a selected second light-receiving site, different from the first site, (2) a second diffracted light beam component of order m, containing a second wavelength $\lambda'$ but not the wavelength $\lambda$, is received at the first site, (3) a third diffracted light beam component of order m', with m'≠m, containing at least one of the first and second wavelengths, is received at at least one of the first site and the second site, and (4) a fourth diffracted light beam component, having an incidence angle different from the selected incidence angle and containing at least one of the first and second wavelengths, is received at at least one of the first site and the second site.

18. A system for controlling a light beam, the system comprising:

a diffraction grating, attached to or part of a piezoelectric substrate, having an initial substrate length, where the grating is positioned to receive a beam of light, having at least a selected wavelength $\lambda$, at a light-receiving site of the grating at a selected incidence angle and to provide a first diffracted light beam component of a selected order m containing the wavelength $\lambda$, wherein the substrate is provided with a selected curved surface, and the grating is provided on the curved surface; and a controllable voltage source, connected in a selected direction across the substrate and having an initial voltage difference, where the voltage difference is changed by a selected voltage change amount $\Delta V1$ to cause the substrate length to change by a selected length change amount $\Delta L1$ in the selected direction, whereby at least one of the following occurs, after the voltage change: (1) the first diffracted light beam component is received at a selected second light-receiving site, different from the first site, (2) a second diffracted light beam component of order m, containing a second wavelength $\lambda$ but not the wavelength $\lambda$, is received at the first site, (3) a third diffracted light beam component of order m', with m'≠m, containing at least one of the first and second wavelengths, is received at at least one of the first site and the second site, and (4) a fourth diffracted light beam component, having an incidence angle different from the selected incidence angle and containing at least one of the first and second wavelengths, is received at at least one of the first site and the second site.

* * * * *